(12) United States Patent
Sakurai et al.

(10) Patent No.: US 8,320,011 B2
(45) Date of Patent: Nov. 27, 2012

(54) IMAGE FORMING DEVICE AND METHOD FOR LAYING OUT AND PRINTING PAGES FROM MULTIPLE FILES

(75) Inventors: Kunihiko Sakurai, Gifu (JP); Norio Mizutani, Mie (JP); Kousuke Fukaya, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1185 days.

(21) Appl. No.: 12/149,314

(22) Filed: Apr. 30, 2008

(65) Prior Publication Data

US 2008/0266589 A1    Oct. 30, 2008

(30) Foreign Application Priority Data

Apr. 30, 2007 (JP) ................................. 2007-120415

(51) Int. Cl.
*G06K 15/00* (2006.01)
(52) U.S. Cl. ......... 358/1.18; 358/450; 400/76; 715/243; 715/255
(58) Field of Classification Search .................. None
See application file for complete search history.

(56) References Cited

U.S. PATENT DOCUMENTS

| | | | |
|---|---|---|---|
| 5,794,251 A * | 8/1998 | Watanabe et al. ............... | 1/1 |
| 2002/0080405 A1 * | 6/2002 | Kuroda ............................ | 358/1.18 |
| 2002/0165882 A1 * | 11/2002 | Zettel et al. ..................... | 707/530 |
| 2004/0181667 A1 * | 9/2004 | Venters et al. .................. | 713/164 |
| 2004/0240919 A1 * | 12/2004 | Hisatomi ......................... | 400/76 |
| 2007/0047020 A1 * | 3/2007 | Kim ................................. | 358/450 |

FOREIGN PATENT DOCUMENTS

| | | |
|---|---|---|
| JP | 7-85089 | 3/1995 |
| JP | 11-203282 | 7/1999 |
| JP | 2001-236343 | 8/2001 |
| JP | 2003-91392 | 3/2003 |
| JP | 2003-316542 | 11/2003 |
| JP | 2004-255729 | 9/2004 |
| JP | 2005-128849 | 5/2005 |
| JP | 2007-305018 | 11/2007 |
| WO | WO 9318480 A1 * | 9/1993 |

* cited by examiner

*Primary Examiner* — King Poon
*Assistant Examiner* — David S Cammack
(74) *Attorney, Agent, or Firm* — Scully, Scott, Murphy & Presser, PC

(57) ABSTRACT

An image forming device includes a printing unit configured to print images on a recording sheet, a page number acquiring unit configured to acquire a common page number which is common among a plurality of files subject to be printed, a page extracting unit configured to extract a page of image from page data contained in each of the plurality of files based on the common page number acquired by the page number acquiring unit, and a print control unit configured to control the printing unit to print a plurality of images respectively extracted from the plurality of files, which are extracted by the page extracting unit, on a page of a recording sheet.

5 Claims, 16 Drawing Sheets

FIG.3A
| NUMBER | ARRANGEMENT NUMBER |
|---|---|
| #1 | 2 |
| #2 | 4 |
| #3 | 8 |
| #4 | 16 |
T
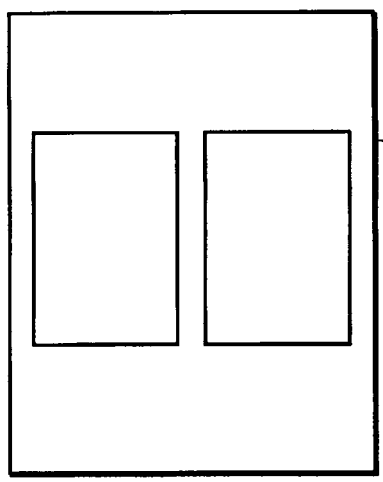
FIG.3B
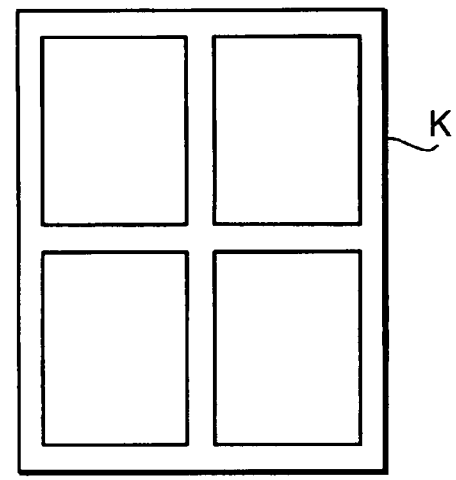
FIG.3C
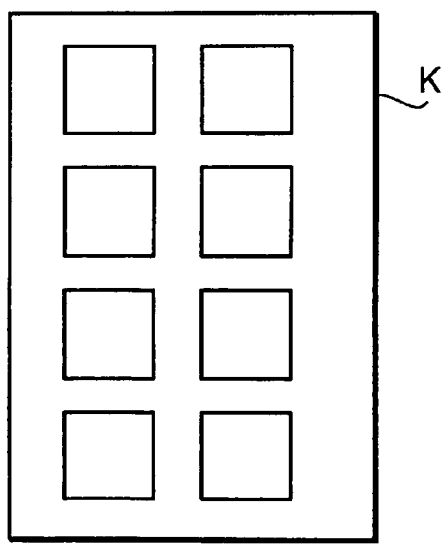
FIG.3D
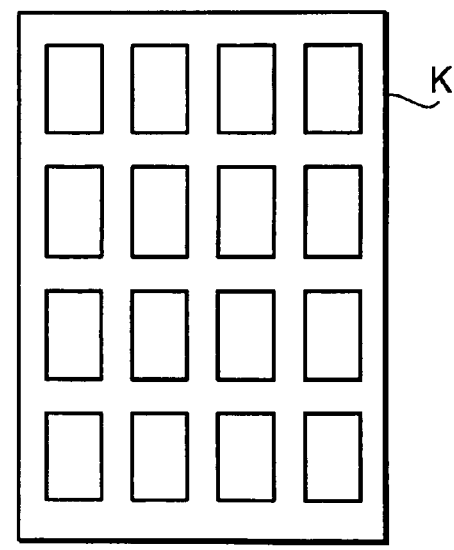
FIG.3E

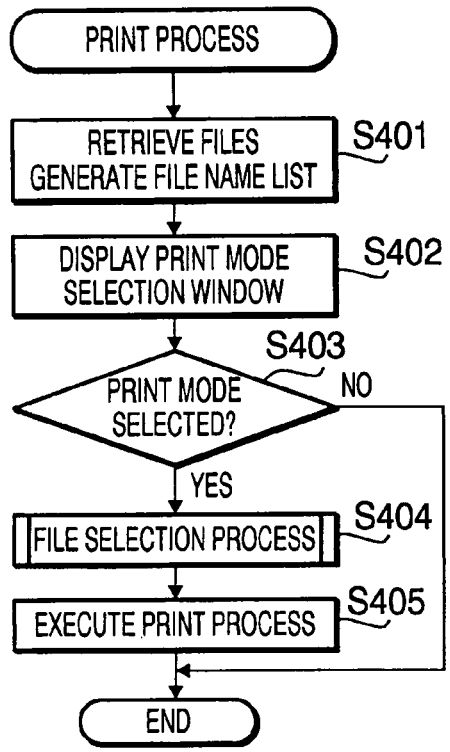
FIG.4A
FIG.4B
```
SELECT PRINT MODE
1. PHOTO MODE      4.
2. HIGH-QUALITY MODE  5.
3. QUICK PRINT MODE   ⋮
```
FIG.4C
```
SELECT FILE
1. testdata.pdf   4.
2. sample.pdf     5.
3. text.pdf       6.
```
FIG.4D
```
PRINTING ...
```
FIG.4E

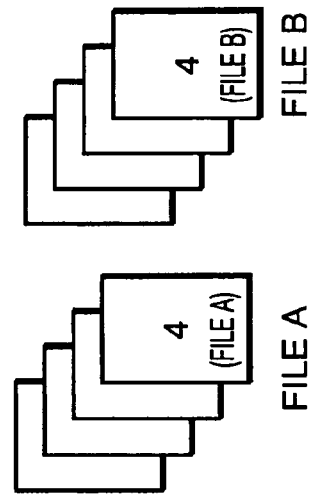
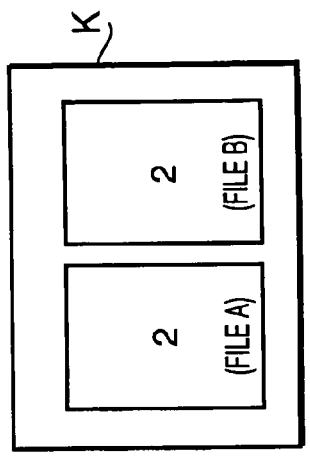
FIG.5A
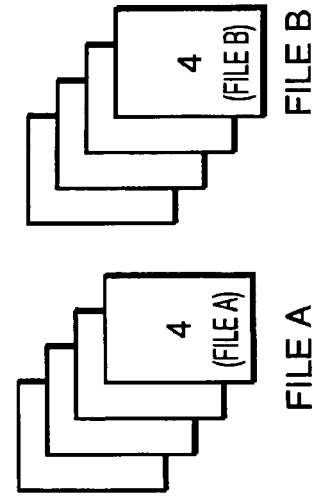
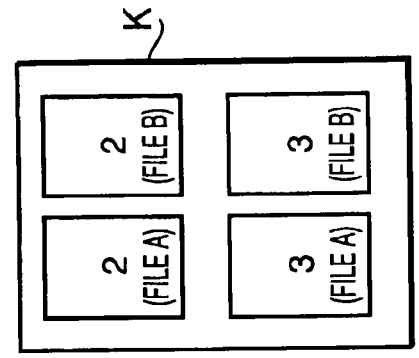
FIG.5B

IMAGE FORMING DEVICE AND METHOD FOR LAYING OUT AND PRINTING PAGES FROM MULTIPLE FILES

CROSS-REFERENCE TO RELATED APPLICATION

This application claims priority under 35 U.S.C. §119 from Japanese Patent Application No. 2007-120415 filed on Apr. 30, 2007. The entire subject matter of the application is incorporated herein by reference.

BACKGROUND

1. Technical Field

The invention relates to an image forming device capable of extracting desired pages from a plurality of files and forming images of the extracted pages on a page of a recording sheet.

2. Related Art

Conventionally, image forming devices configured to form images on recording sheets based on data files have been known. Japanese Laid-Open Patent Publication No. 2004-255729 (hereinafter, referred to as '729 publication) discloses a multi-function printer configured to print thumbnail images of a plurality of image data files, which are stored in a memory card, on a page of a recording sheet, in association with file names, as an index sheet.

SUMMARY OF THE INVENTION

According to the multi-function printer disclosed in '729 publication, however, when each data file includes a plurality of pages of text data, it is impossible to print, for example, a third page of each file on the same page of a recording sheet or a second page of one file and a third page of another file on the same page of a recording sheet.

Embodiments provide for an image forming device that is configured to extract desired pages from each of a plurality of files and form images of the extracted pages on a page of a recording sheet.

According to aspects of the invention, there is provided an image forming device, which includes a printing unit configured to print images on a recording sheet, a page number acquiring unit configured to acquire a common page number which is common among a plurality of files subject to be printed, a page extracting unit configured to extract a page of image from page data contained in each of the plurality of files based on the common page number acquired by the page number acquiring unit, and a print control unit configured to control the printing unit to print a plurality of images respectively extracted from the plurality of files, which are extracted by the page extracting unit, on a page of a recording sheet.

According to further aspects of the invention, there is provided an image forming device, which includes a printing unit configured to print images on a recording sheet, a first input unit configured to allow a user to input first information necessary for identifying the main file from a plurality of files stored in a recoding medium, a second input unit configured to allow the user to input second information necessary for identifying the plurality of dependent files from a plurality of files stored in the recording medium, an identifying unit configured to identify the main file and the dependent files based on the first information and the second information, a page number acquiring unit configured to acquire independent page numbers which designate page numbers of the main file and dependent page numbers which designate page numbers of the dependent files, a page extracting unit configured to extract a page of image from page data contained in each of the plurality of files based on the common page number acquired by the page number acquiring unit, and a print control unit configured to control the printing unit to print a plurality of images respectively extracted from the plurality of files, which are extracted by the page extracting unit, on a page of a recording sheet. The page extracting unit extracts pages of images from page data contained in each of the plurality of dependent files based on the dependent page numbers and pages of images from the main file based on the independent page numbers, and the print control unit controls the printing unit to print the plurality of pages of images extracted from the main file and the plurality of pages of image extracted from the dependent files such that a page of image extracted from the main file and a plurality of corresponding images extracted from the dependent files are printed on a page of the recording sheet.

According to further aspects of the invention, there is provided an image forming device that includes a page number designating unit configured to allow a user to designate page numbers of a main file to be printed, a first page extracting unit configured to extract pages, which are identified by the page numbers designated by the page number designating unit, from the main file, a second page extracting unit configured to extract pages, which correspond to the pages extracted from the main file by the first extracting unit, from at least one sub file, an arrangement unit configured to arrange the extracted pages of the main file and the extracted pages of the at least one sub file such that the arranged pages can be printed on a page of a recording sheet, a print data generating unit configured to generate print data reflecting the arrangement determined by the arrangement unit, and a printing unit configured to execute printing operation based on the print data generated by the print data generating unit.

According to further aspects of the invention, there is provided an image forming device that includes a first page designating unit configured to allow a user to designate page numbers of a main file to be printed, a second page designating unit allowing a user to designate page numbers of at least one sub file to be printed, a first page extracting unit configured to extract pages, which are identified by the first page numbers designated by the page number designating unit, from the main file, a second page extracting unit configured to extract pages, which are identified by the page numbers designated by the second page number designating unit, from the at least one sub file, an arrangement unit configured to arrange the extracted pages of the main file and the extracted pages of the at least one sub file such that the arranged pages can be printed on a page of a recording sheet, a print data generating unit configured to generate print data reflecting the arrangement determined by the arrangement unit, and a printing unit configured to execute printing operation based on the print data generated by the print data generating unit.

According to the above configuration, the user can designate desired pages from each of a plurality of files and the image forming device prints the images of the designated pages of the plurality of files on a page of a recording sheet.

BRIEF DESCRIPTION OF THE ACCOMPANYING DRAWINGS

FIG. 3A shows an arrangement table, and FIGS. 3B-3E show page layouts on a recording sheet according to the arrangement table.

FIG. 4A is a flowchart illustrating a print process, and FIGS. 4B-4E show message windows to be displayed on an LCD during execution of the print process shown in FIG. 4A.

FIGS. 5A and 5B schematically illustrate a file selection process according to a first embodiment of the invention.

Figure 6A:
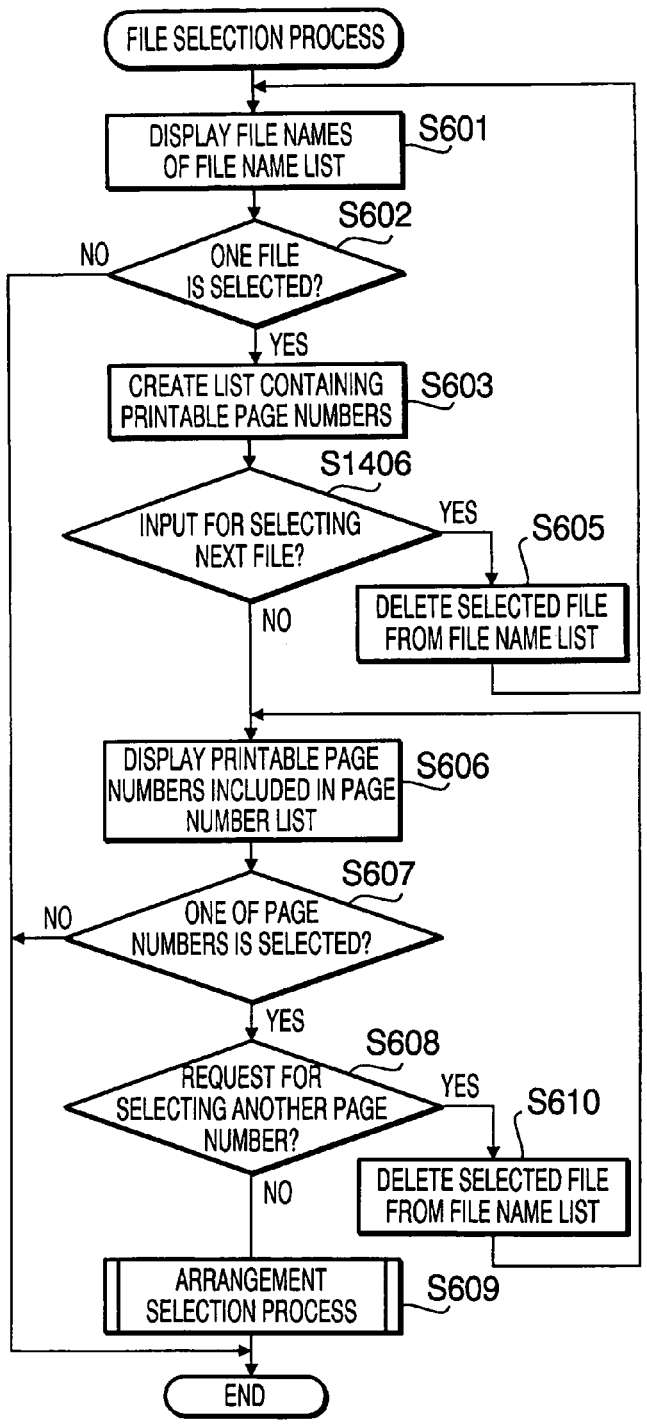

FIG. 6A is a flowchart illustrating the file selection process according to the first embodiment, and FIGS. 6B-6E show message windows to be displayed on the LCD during execution of the file selection process shown in FIG. 6A.

Figure 7:
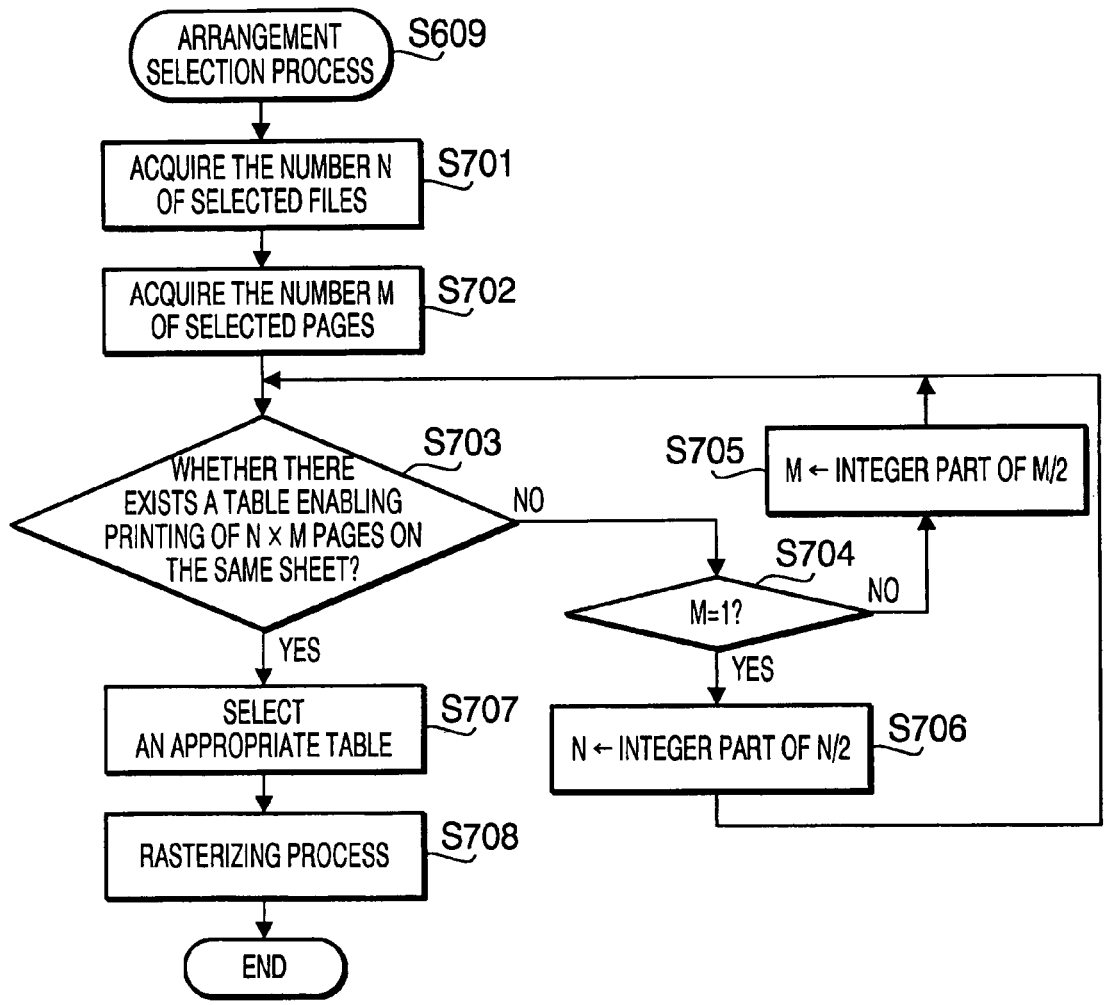

FIG. 7 is a flowchart illustrating an arrangement pattern selection process according to the first embodiment of the invention.

Figure 8:
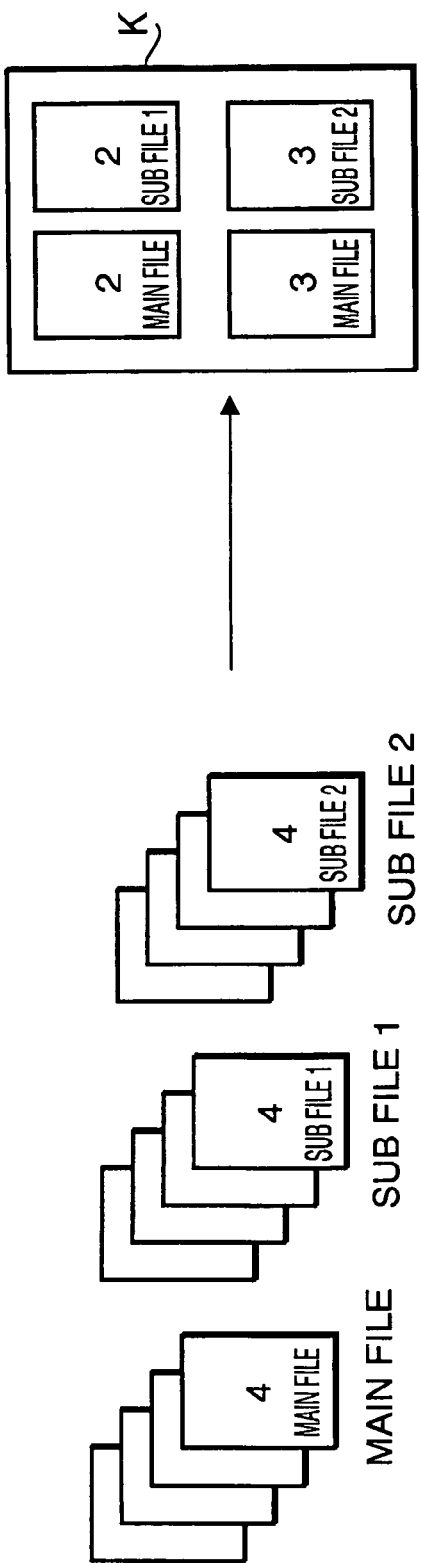

FIG. 8 illustrates a file selection process according to a second embodiment of the invention.

Figure 9:
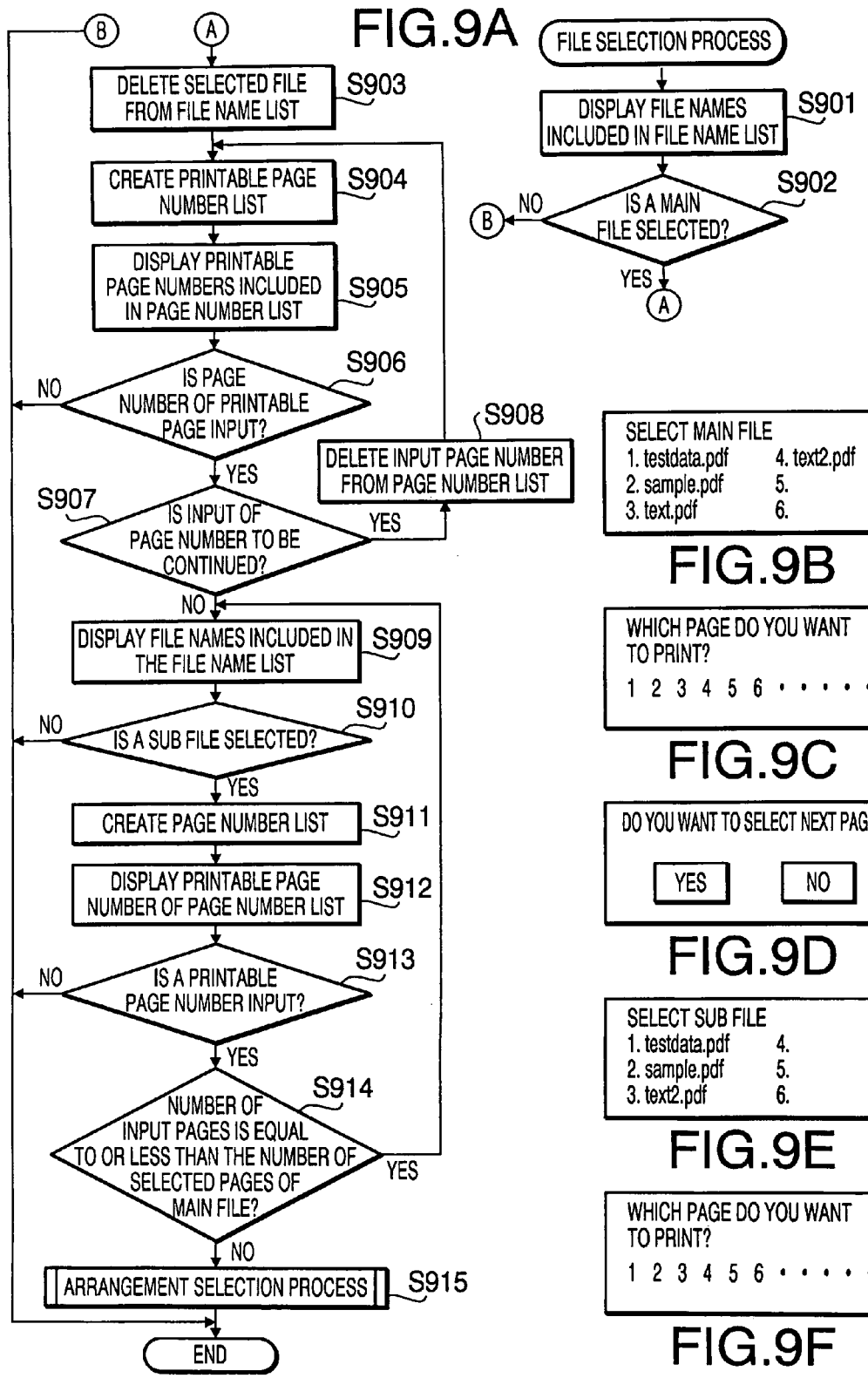

FIG. 9A is a flowchart illustrating the file selection process according to the second embodiment, and FIGS. 9B-9F show message windows to be displayed on the LCD during execution of the file selection process shown in FIG. 9A.

Figure 10:

FIG. 10 illustrates a file selection process according to a third embodiment of the invention.

FIG. 11A is a flowchart illustrating the file selection process according to the third embodiment, and FIGS. 11B-11H show message windows to be displayed on the LCD during execution of the file selection process shown in FIG. 11A.

Figure 12:
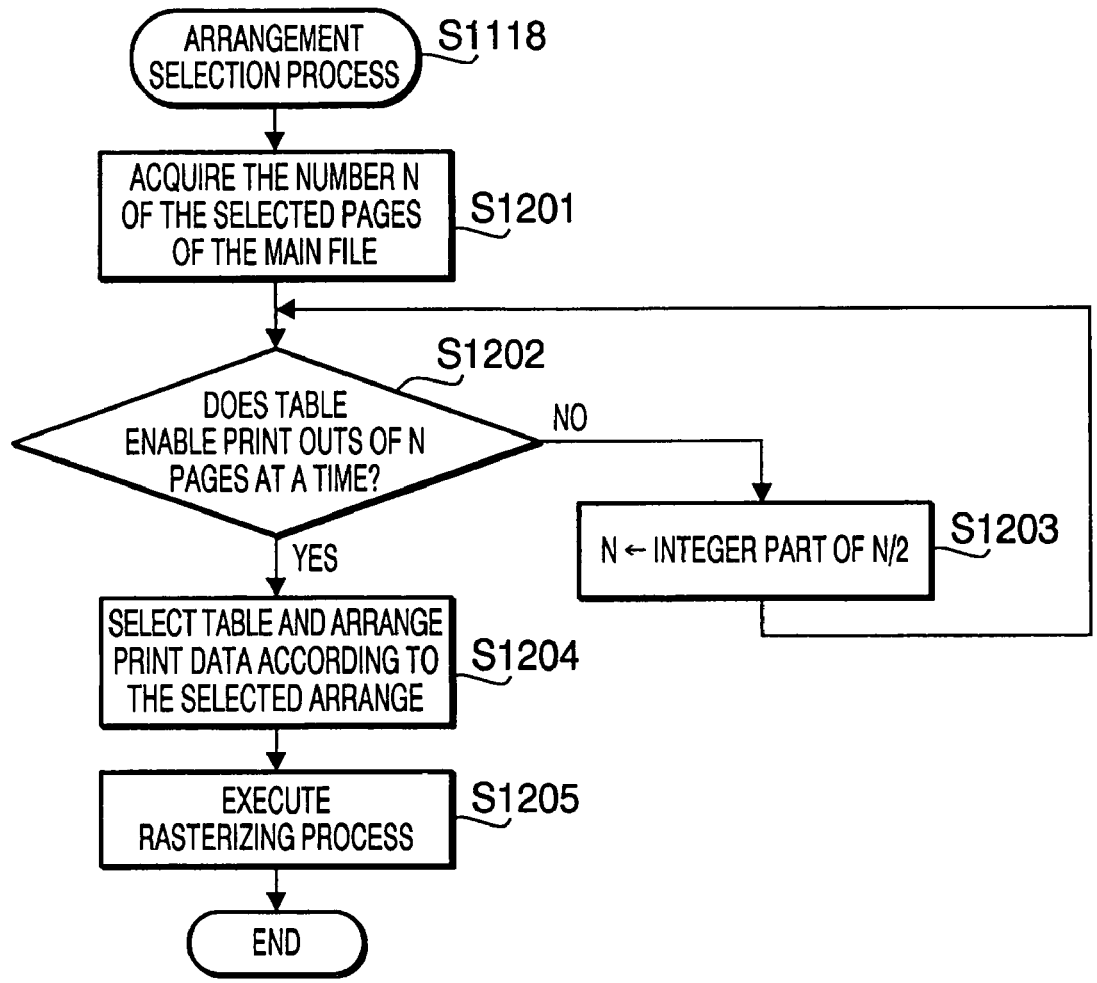

FIG. 12 is a flowchart illustrating an arrangement pattern selection process according to the third embodiment of the invention.

Figure 13:
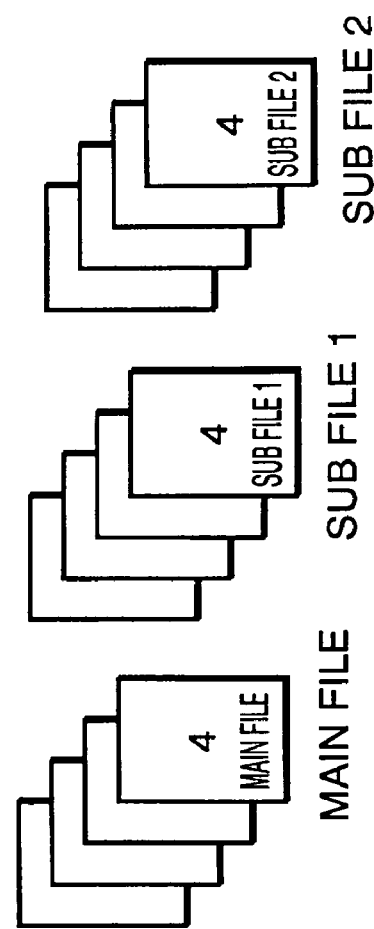

FIG. 13 illustrates a file selection process according to a fourth embodiment of the invention.

Figure 14A:
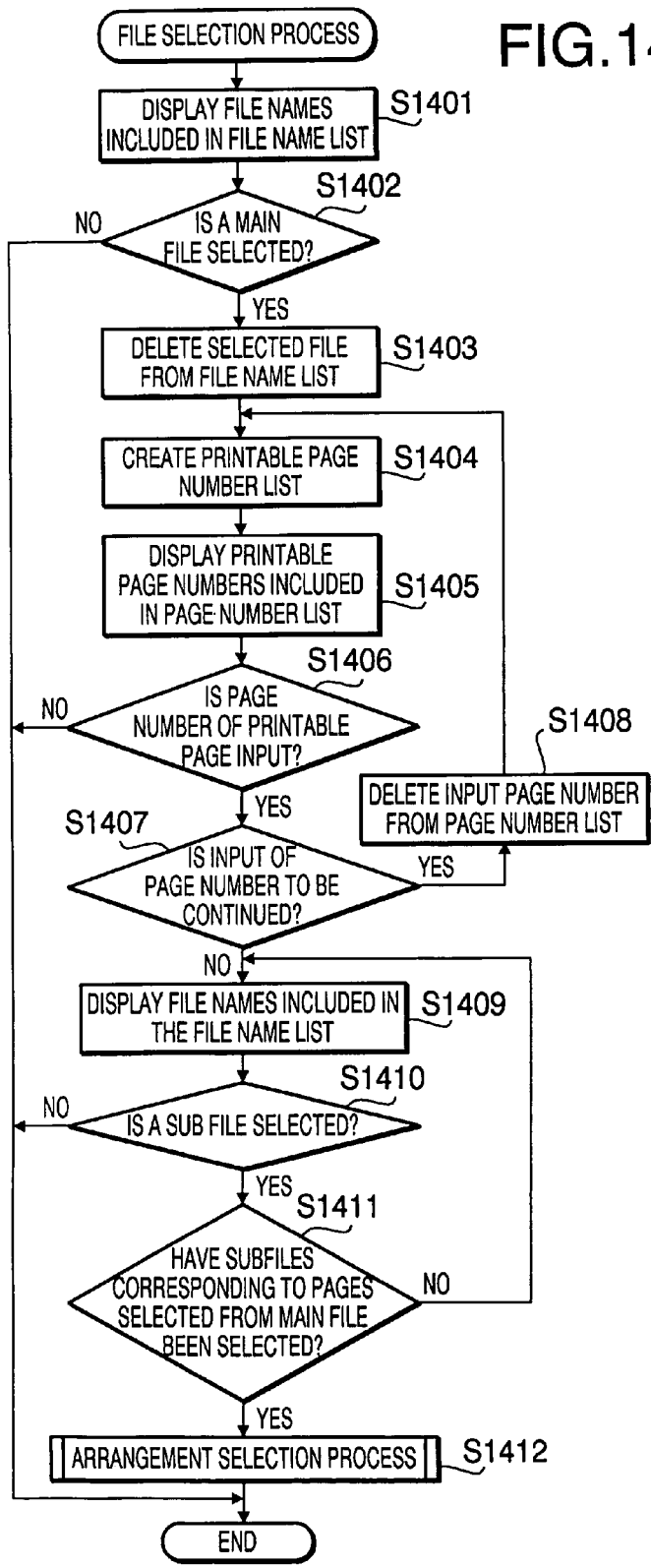

FIG. 14A is a flowchart illustrating the file selection process according to the fourth embodiment, and FIGS. 14B-14E show message windows to be displayed on the LCD during execution of the file selection process shown in FIG. 14A.

Figure 15:
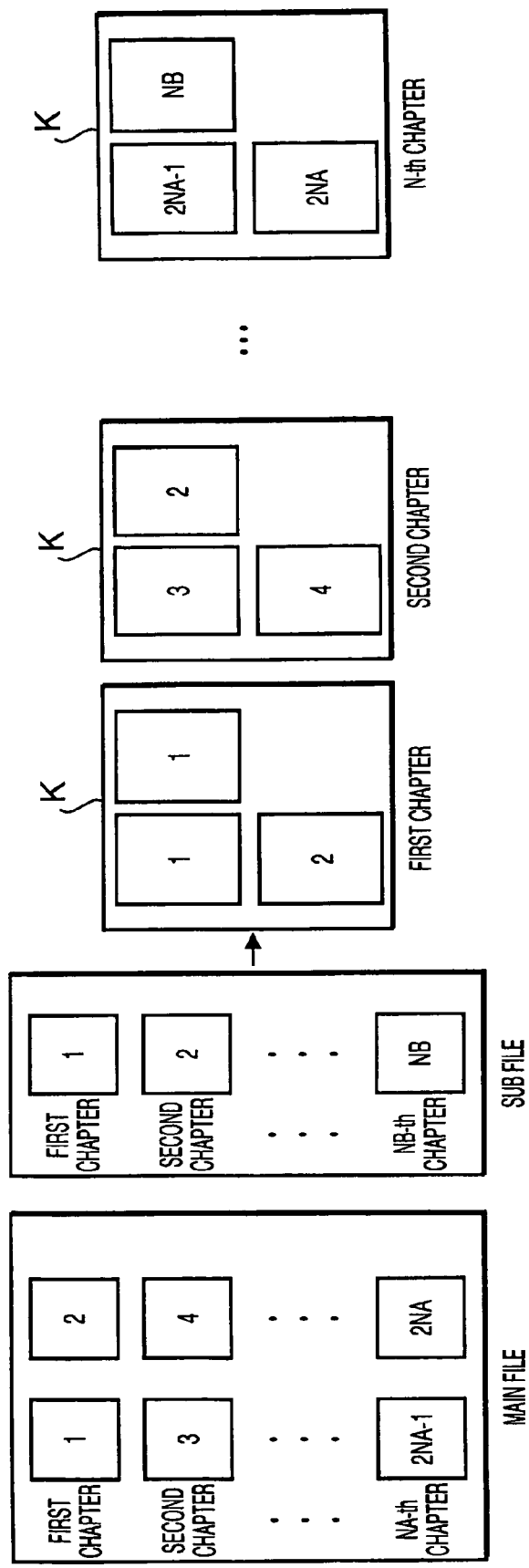

FIG. 15 illustrates a file selection process according to a fifth embodiment of the invention.

Figure 16:
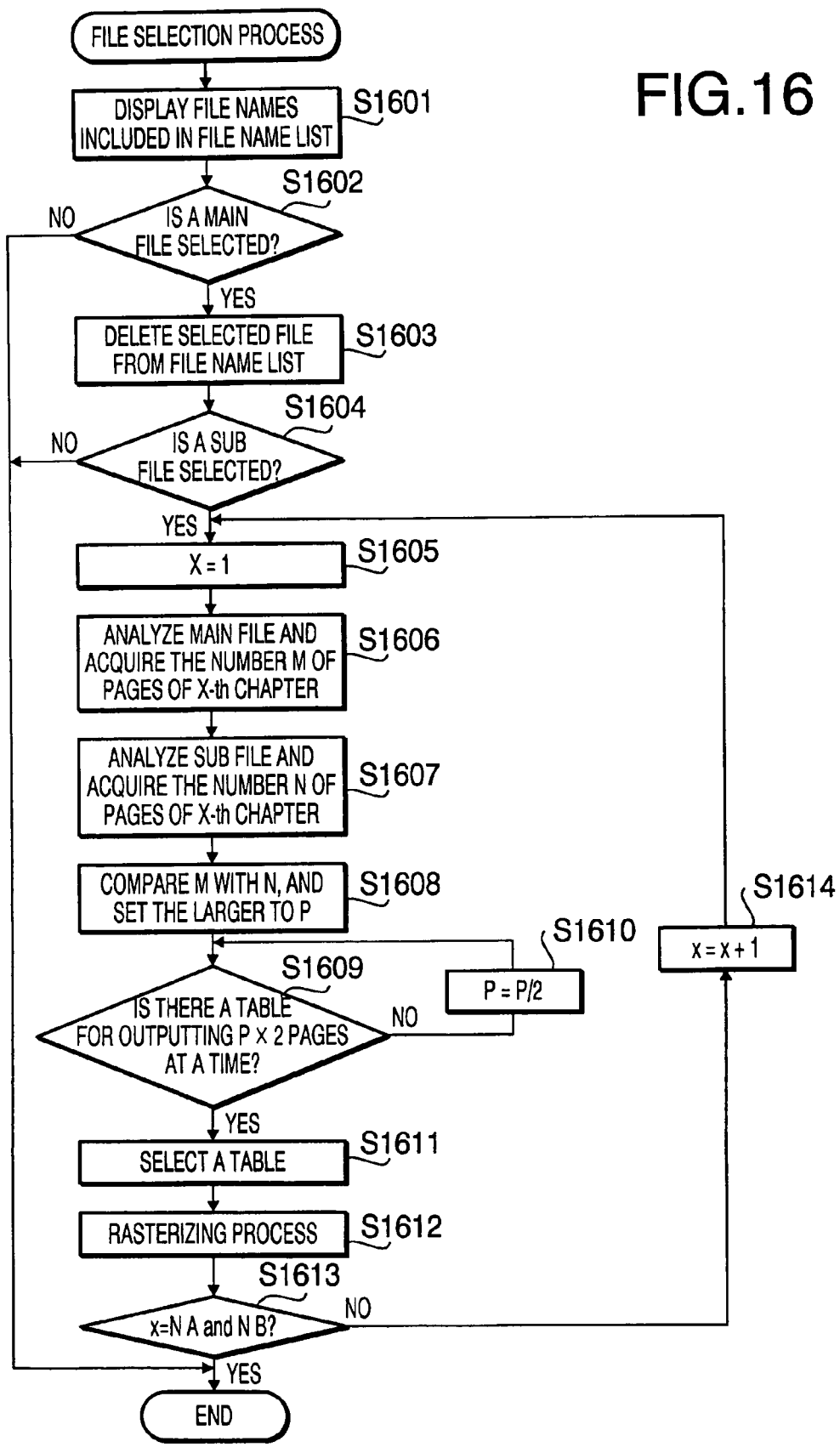

FIG. 16 is a flowchart illustrating the file selection process according to the fifth embodiment.

DETAILED DESCRIPTION

Hereinafter, embodiments of the present invention will be described with reference to the accompanying drawings.

Figure 1:
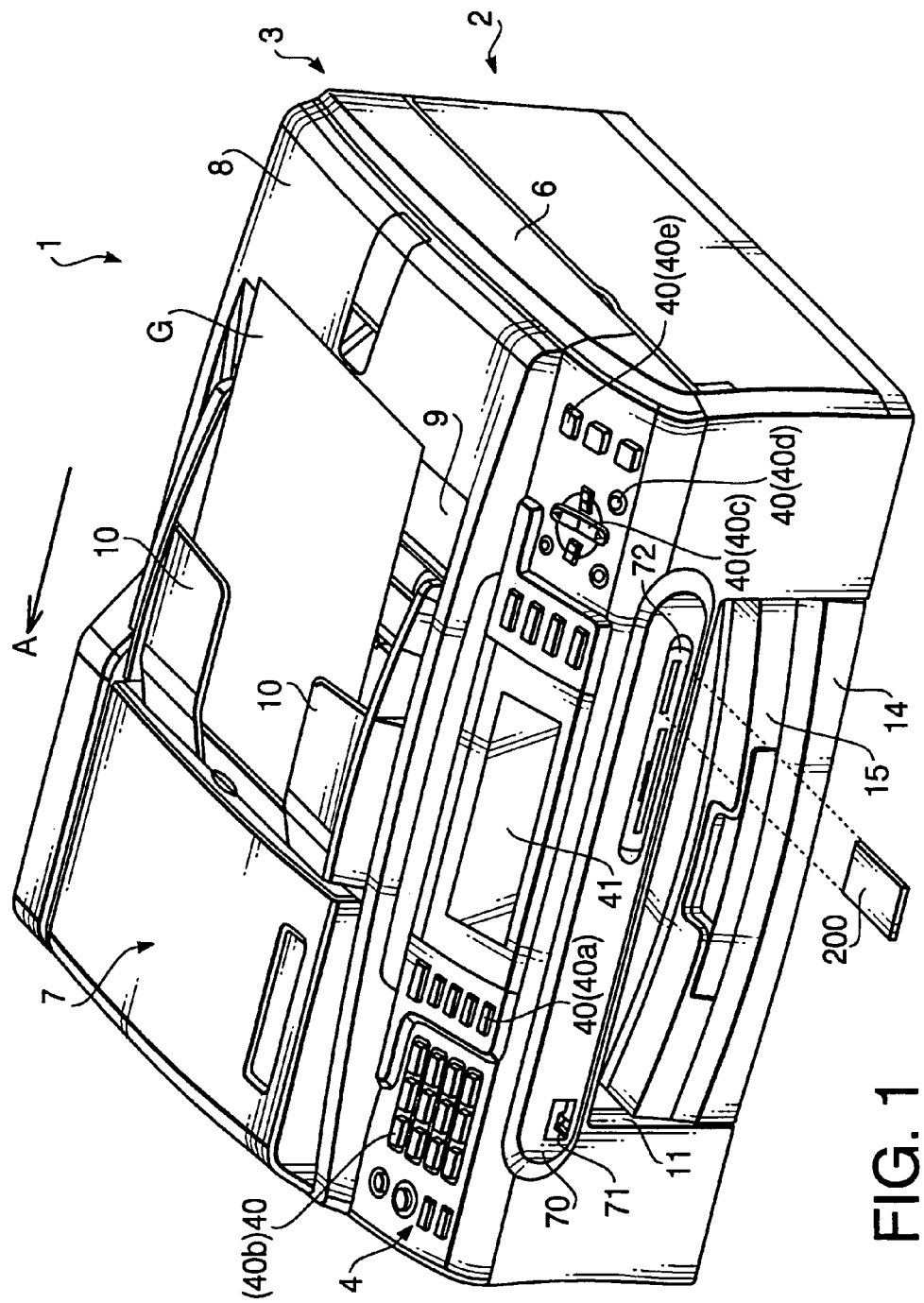
FIG. 1 is a perspective view of an MFD (multi-function device) according to embodiments of the invention.

FIG. 1 is a perspective view showing an appearance of an MFD (multi-function device) 1 according to the embodiments of the present invention. The MFD 1 is configured to extract desired pages from a plurality of files and print the extracted pages on a page of a recording sheet K.

The MFD 1 includes a printer 2 at a lower portion thereof, a scanner 3 at an upper portion thereof, and an operation panel 4 provided on a front side of the scanner 3, which are integrally assembled. The MFD 1 has a printer function, a scanner function, a copier function and a facsimile function.

The MFD 1 further has a function of forming an image on a recording sheet K based on data received from an external device, such as a USB memory, a digital camera, and a personal computer, which are connectable to the MFD 1. The MFD 1 is also configured to display the data received from the external device on an LCD (liquid crystal display) 41 of the operation panel 4.

The scanner 3 is provided with a document scanning table 6 and an original document cover 8, and functions as an FBS (flatbed scanner). The original document cover 8 is provided with an ADF (automatic document feeder) 7. The document scanning table 6 is provided with a platen glass at its top. A well-known image scanning unit is provided inside the document scanning table 6. The scanner 3 is configured to scan images from an original document G by the FBS or the ADF 7.

The ADF 7 feeds an original document G from an original document tray 9 to a document discharge tray 10 through a document feed path. When the original document G is fed by the ADF 7, the original document G passes over an image scanning surface defined on the document scanning table 6, and an image of the original document G is scanned by the scanning unit located below the image scanning surface. This scanning operation using the ADF 7 is performed with the original document cover 8 being closed with respect to the document scanning table 6.

The printer 2 forms an image on a recording sheet K based on the image data scanned by the scanner 3 or transmitted from the external device. The printer 2 according to the embodiments is a so-called inkjet image forming device. It should be noted that the inkjet image forming device is only an example of an image forming device, and other types of image forming devices such as electrophotographic image forming devices and thermal transfer image forming devices may be used as the printer 2.

The MFD 1, i.e., the printer 2 has an opening 11 formed therethrough at a front of the printer 2. A sheet feed tray 14 and a sheet discharge tray 15 are provided inside the opening 11. The sheet discharge tray 15 is disposed above the sheet feed tray 14.

The operation panel 4 is provided on the front of the MFD 1. The operation panel 4 is used for operating the printer 2 and the scanner 3, and is provided with various operation keys 40 (40a, 40b, 40c, 40d, and 40e) and the LCD 41.

Among the operation keys 40 (40a, 40b, 40c, 40d and 40e), the operation key 40a is a menu key for displaying a menu window on the LCD 41, the operation keys 40b are available for a numeric keypad for inputting numerals/symbols, the operation key 40c is a direction key for moving a cursor displayed on the LCD 41, the operation key 40d is a select key for selecting an item designated by the cursor (e.g., highlighted item), and the operation key 40e is an end key for closing the menu window.

The LCD 41 has a rectangular screen having a longer side extending in a direction indicated by an arrow A. An aspect ratio of a shorter side to the longer side of the LCD 41 is 3:8. Specifically, the LCD 41 includes integrally-arranged two LCD components each having the aspect ratio of 3:4, which are arranged side by side along the direction indicated by the arrow A. In FIG. 1, for illustration purpose, the ratio is not accurate.

When a predetermined command is input to the MFD 1, a control unit 20 (see FIG. 2) controls the operation of the MFD 1 based on the input command. It should be noted that the MFD 1 operates in accordance with commands transmitted from a printer driver or a scanner driver running on the computer (external device) as well as the commands input through the operation panel 4.

A connection panel 70 is provided below the operation panel 4 and above the opening 11. The connection panel 70 is formed with a USB terminal 71 on its left-hand side end portion. An external device can be connected to the printer 1 through the USB terminal 71 and data exchange can be done therebetween.

A slot section 72 is formed at a right-hand side end of the connection panel 70. The slot section 72 includes a plurality of card slots, into which memory cards are insertable respectively. When a memory card 200 is inserted in one of the card slots provided at the slot section 72 and image data stored in the memory card 200 is read out by the control unit 20, image data and/or information regarding the readout image data is displayed on the LCD 41. Alternatively, an image of arbitrarily selected image data of the image data stored in the memory card 200 is formed on the recording sheet K by the printer 2.

Figure 2:
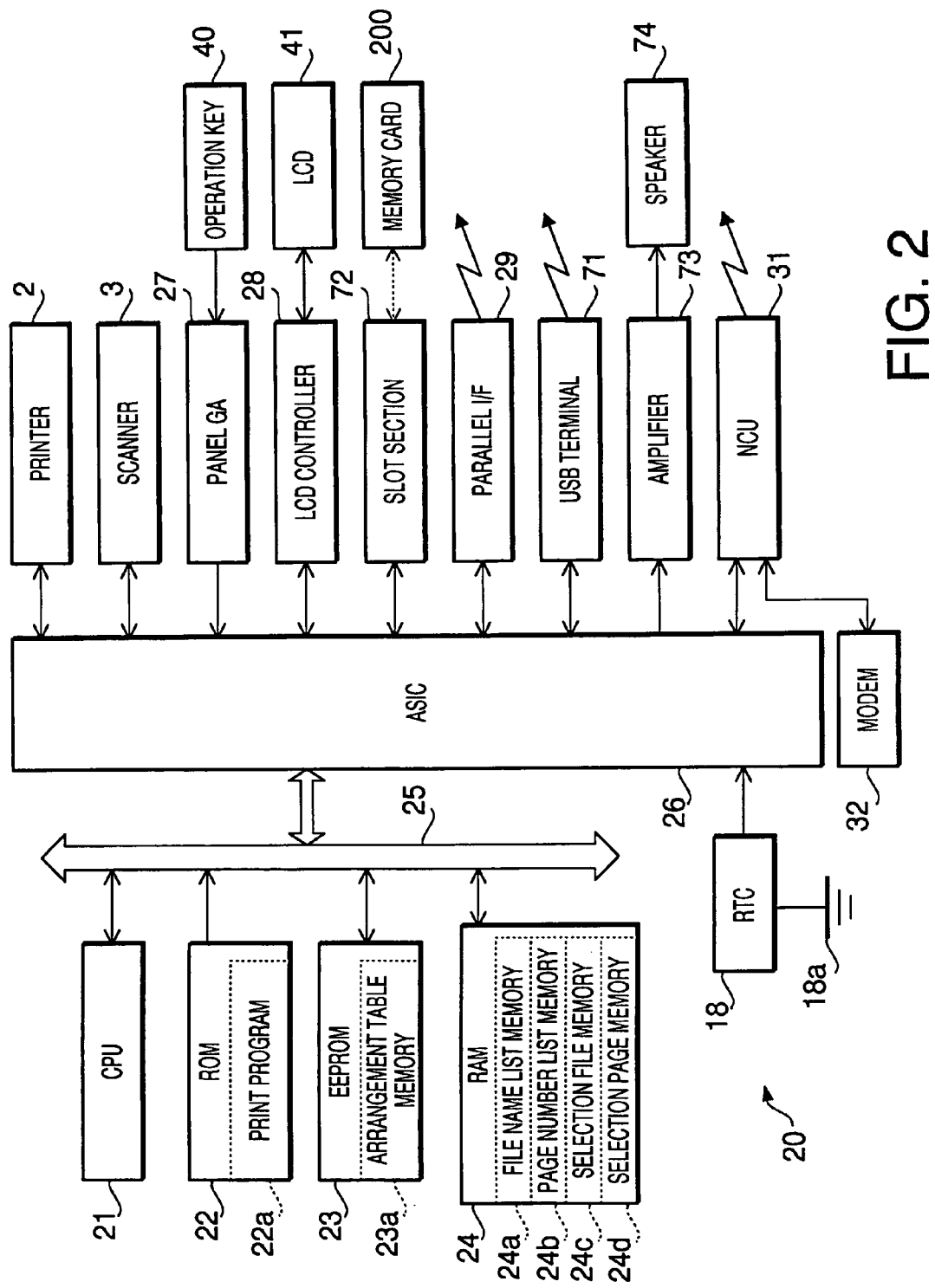
FIG. 2 is a block diagram showing a control system of the MFD shown in FIG. 1.

Next, referring to FIG. 2, a schematic configuration of the control unit 20 for controlling the operation of the MFD 1 will be described. FIG. 2 is a block diagram of the control unit 20. The control unit 20 controls an entire operation of the MFD 1 including the printer 2, the scanner 3 and the operation panel 4.

The control unit 20 is configured as a microcomputer including a CPU 21, a ROM 22, a RAM 23, an EEPROM (electrically erasable programmable ROM) 24. These components are connected to an ASIC (application-specific integrated circuit) 26 through a bus 25.

The CPU 21 is a central processing unit that controls the entire operation of the MFD 1 by executing appropriate programs stored in the ROM 22. The ROM 22 stores various programs for controlling the operations of the MFD 1. For example, the ROM 22 stores a print process program 22a for performing a print process shown in FIG. 4A.

The EEPROM 23 stores an arrangement table memory 23a storing an arrangement table T, which will be described referring to FIGS. 3A-3E. FIG. 3A shows the arrangement table T, and FIGS. 3B-3E each shows an arrangement pattern of pages extracted from a plurality of files to be printed on a recording sheet K according to the arrangement table T. As shown in FIG. 3A, the arrangement table T includes a plurality of, e.g., four, arrangement patterns. An arrangement pattern #1 is an arrangement of two pages, an arrangement pattern #2 is an arrangement of four pages, an arrangement pattern #3 is an arrangement of eight pages, and an arrangement pattern #4 is an arrangement of sixteen pages.

When the arrangement pattern #1 is selected, two pages of data are arranged side by side on a single page of a recording sheet K as shown in FIG. 3B. When the arrangement pattern #2 is selected, four pages of data are arranged in a two by two matrix on a single page of a recording sheet K as shown in FIG. 3C. When the arrangement pattern #3 is selected, eight pages of data are arranged in four rows, each row having two pages of data, as shown in FIG. 3D on a single page of a recording sheet K. When the arrangement pattern #4 is selected, sixteen pages of data are arranged in a four by four matrix on a single page of a recording sheet K as shown in FIG. 3E. It should be noted that the arrangement patterns are not limited to the above-described four patterns.

The RAM 24 is used as a workspace or a storage for temporarily storing data which is used when the CPU 21 executes the various programs. The RAM 24 is provided with a file name list memory 24a, a page number list memory 24b, a selected file number memory 24c and a selected page number memory 24d.

The file name list memory 24a stores a list of file names of files to be printed. The page number list memory 24b stores a page number list indicating printable pages among page numbers which are assigned to respective pages of the files to be printed. The selected file number memory 24c stores the number of files to be printed, and the selected page number memory 24d stores the page numbers to be printed.

The ASIC 26 controls the operation of the printer 2, the scanner 3, the operation panel 4 and the slot section 72 in accordance with commands issued by the CPU 21. The ASIC 26 controls, for example, operation of motors and an inkjet recording head of the printer 2, and a motor for driving the ADF 7 and the image scanning unit of the scanner 3. Since the printer 2, the scanner 3 and the slot section 72 are well-known devices, detailed descriptions thereof will be omitted for brevity.

A panel gate array (GA) 27 for controlling the operation keys 40 for inputting various commands to the MFD 1, an LCD controller 28 for controlling display on the LCD 41, a parallel interface (I/F) 29 for transmitting/receiving data to/from the computer through a parallel cable, and a USB terminal 71 for transmitting/receiving data to/from the computer through a USB cable are connected to the ASIC 26. Further, a speaker 74 is connected to the ASIC 26 via an amplifier 73. An RTC (real-time clock) 18, which is a microchip for a clock, is also connected to the ASIC 26. The RTC 18 is connected with a battery 18a so that the RTC 18 keeps operating while the printer 1 is powered off.

Further, an NCU (network control unit) 31 is connected to the ASIC 26, and a modem 32 is connected to the NCU 31. The NCU 31 is provided for controlling a communications circuit, and is connected to a public telephone line. The NCU 31 receives various signals such as a ringing signal transmitted from an exchange. Further, the NCU 31 transmits a dialing signal for making a call to the exchange in accordance with operation of the operation keys 40. When the telephone line is connected to the exchange, the NCU 31 performs data communications such as transmission/reception of analog audio signals.

The modem 32 is provided for modulating/demodulating facsimile data and email data. The modem 32 also transmits/receives procedural signals for data transmission control. The facsimile data is transmitted/received in accordance with a facsimile transmission/reception procedure by the NCU 31 and the modem 32.

Next, a print process according to a first embodiment will be described referring to FIGS. 4A-4E. FIG. 4A is a flowchart illustrating the print process, and FIGS. 4B-4E show message windows to be displayed on the LCD 41 during execution of the print process shown in FIG. 4A.

The print process shown in FIG. 4A is a process for extracting desired pages from a plurality of files stored in the memory card 200 and printing the extracted pages on the same page of a recording sheet K. The print process starts when a user inputs a command to start the print process while the memory card 200 is connected to the printer 1 (i.e., inserted in the slot section 72).

In the print process, first, the process retrieves files stored in the memory card 200 and generates a file name list in which file names of the retrieved files are listed (S401). During retrieval of the files in S401, a message window indicating a message such as "Retrieving files. Please wait." is displayed on the LCD 41 (see FIG. 4B). The generated file name list is stored in the file name list memory 24a.

After the file name list is generated, the process displays a print mode selection window as shown in FIG. 4C on the LCD 41 (S402). The print mode selection window shows a message such as "Please select a print mode." and a plurality of print modes such as "1. Photo mode," "2. High-quality mode," "3. Quick print mode".

The step S402 of FIG. 4A may be modified such that the user may be allowed to select one of a plurality modes which correspond to, for example, the first through fifth embodiments (second through fifth embodiments being described later), respectively. Alternatively, the step S404 of FIG. 4A may be modified such that one of the first through the fifth embodiments is executed in accordance with the selection made by the user in S402.

After displaying the print mode selection window on the LCD 41, the process judges whether one of the print modes is selected (S403). Specifically, the process judges whether the user has pressed the select key 40d to select a desired print mode from the print modes displayed on the LCD 41 after operating the direction key 40c to move the cursor on the screen of the LCD 41 to highlight the desired one of the print modes. If one of the print modes is selected (S403: YES), the process executes a file selection process (S404), which will be described in detail later. In the file selection process, the process displays a message window showing a message such as "Please select a file." and the file names (e.g., "1. testdata.pdf," "2. sample.pdf," and "3. text.pdf") which are included in the file name list generated in S401 on the LCD 41, as shown in FIG. 4C.

In the file selection process, print data is generated such that user's desired pages selected from a plurality of files are printed on the same page of a recording sheet K. Then, based on the generated print data, the process executes a printing operation (S405). When the process starts the printing operation in S405, the process displays a message window showing a message such as "Printing." on the LCD 41, as shown in FIG. 4E.

Next, referring to FIGS. 5A, 5B, 6A-6E and 7, the file selection process according to the first embodiment will be described in detail.

FIGS. 5A and 5B schematically illustrate the file selection process according to the first embodiment. As mentioned above, in the file selection process, the print data is generated such that the plurality of pages, which have the same page number and are extracted from the plurality of files, are printed on the same page of the recording sheet K. Hereinafter, pages having the same page number refer to common pages.

FIG. 5A shows an example in which a second page is extracted from each of a file A consisting of four pages of data and a file B consisting of four pages of data and print data is generated such that the second page of the file A and the second page of the file B are printed on the same page of a recording sheet K. That is, the pages having the same page number are extracted from the different files.

FIG. 5B shows another example in which second and third pages are extracted from each of the file A consisting of four pages of data and the file B consisting of four pages of data and print data is generated such that the extracted pages of data are printed on the same page of a recording sheet K.

Next, referring to FIGS. 6A-6E, the file selection process according to the first embodiment will be described. FIG. 6A is a flowchart illustrating the file selection process according to the first embodiment, and FIGS. 6B-6E show message windows to be displayed during execution of the file section process shown in FIG. 6A.

Figure 6B:
Figure 6C:
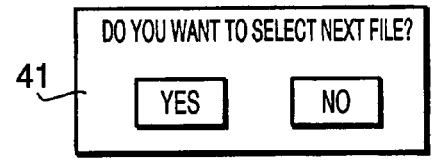

When the file selection process starts, the process displays the file names, which are included in the file name list generated in S401 of the print process (FIG. 4A), on the LCD 41 (S601). Specifically, the process displays a message window showing a message such as "Please select a file." and the list of the file names (e.g., "1. testdata.pdf," "2. sample.pdf," and "3. text.pdf") on the LCD 41, as shown in FIG. 6B.

In S602, the process judges whether one of the listed file names is selected within a predetermined time period. Specifically, the process judges whether the user has pressed the select key 40 to select a desired file name from the listed file names after operating the direction key 40c to move the cursor displayed on the LCD 41 to highlight the desired file name. If no file is selected within the predetermined time period (S602: NO), the file selection process ends.

If a file name is selected (S602: YES), the process analyzes a file identified by the selected file name, determines the page numbers indicating respective pages constituting the selected file, and generates a page number list which is a list of the page numbers of printable pages (S603). The generated page number list is stored in the page number list memory 24b.

When the file name is selected (S602: YES), the process switches the window displayed on the LCD 41 from the window shown in FIG. 6B to a window shown in FIG. 6C. In the window shown in FIG. 6C, the user is prompted to determine whether the user selects another file. That is, a message such as "Do you want to select another file?" and selection buttons, "YES" and "NO", are displayed on the window displayed on the LCD 41. Further, the process stores information representing that a first file, i.e., a total of one file, has been selected, in the selected file number memory 24c.

In S604, the process judges whether a command to select another file is input. That is, the process judges whether the user has pressed the select key 40d to select "YES" or "NO" on the message window displayed on the LCD 41 after operating the direction key 40c to locate the cursor on one of the buttons of "YES" and "NO".

If "NO" is selected (S604: NO), the process proceeds to S606. If "YES" is selected (S604: YES), the process deletes the selected file name from the file name list (S605) and displays the file names remaining in the file name list again on the LCD 41 (S601). That is, the process deletes the file name selected in S602 from the file name list stored in the file name list memory 24a and displays the file names still included in the file name list on the LCD 41 in S601.

In S602, the process judges again whether a file name is selected. If one of the file names is selected (S602: YES), the process analyzes a file identified by the newly selected file name and determines page numbers, which indicate respective pages constituting the file, as printable page numbers. Then, the process compares the printable page numbers of the newly selected file and the printable page numbers included in the page number list (i.e., the page number list stored in the page number list memory 24b) to generate another page number list that contains the printable page numbers commonly included in the newly selected file and the page number list stored in the page number list memory 24b. Then, the page number list stored in the page number list memory 24b is replaced with the newly created page number list (i.e., the page number list stored in the page number list memory 24b is updated). With this process, in the page number list stored in the page number list memory 24b, only the page numbers commonly included in the selected files are listed as the printable page numbers. The process then stores information indicating that a second file, i.e., a total of two files, has been selected, in the selected file number memory 24c.

Next, the process judges whether a command to select another file is input in S604. If "NO" is selected (S604: NO), the process proceeds to S606. If "YES" is selected (S604: YES), the process proceeds to S601 via S605 and performs the above-described process.

Figure 6D:
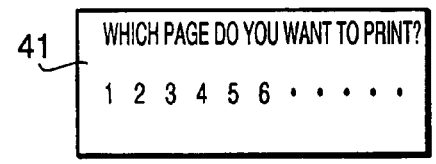
Figure 6E:
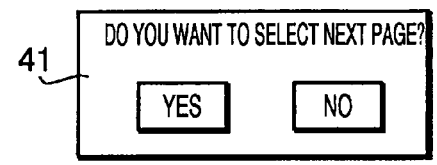

In S606, the process displays the printable page numbers included in the page number list generated in S603 on the LCD 41. FIG. 6D shows an example of a window displaying the printable page numbers. As shown in FIG. 6D, a message such as "Which page do you want to print?" and the page numbers (e.g., 1, 2, 3, 4, 5, and 6) included in the page number list are displayed.

In S607, the process judges whether one of the page numbers is selected within a predetermined time period. Specifically, the process judges whether the user has pressed the select key 40d to select a desired page number after operating the direction key 40c to move the cursor on the window shown in FIG. 6D to highlight the desired page number. If none of the page numbers is selected within the predetermined time period (S607: NO), the file selection process ends.

If one of the printable page numbers is selected (S607: YES), the process stores the selected printable page number in the selected page number memory 24d, and switches the window displayed on the LCD 41 from the window shown in FIG. 6D to a window shown in FIG. 6E. That is, the process displays the window having a message such as "Do you want to select another page?" and selection buttons, "YES" and "NO", on the LCD 41.

Then, the process judges whether a request for selecting another page number is made in S608. That is, the process judges whether the user has pressed the select key 40d to select "YES" or "NO" after operating the direction key 40c to locate the cursor on one of the buttons of "YES" and "NO".

If "YES" is selected (S608: YES), the process deletes the selected printable page number from the page number list (S610) and displays the printable page numbers remaining in the page number list (S606). Thereafter, the process performs S607 and subsequent steps.

If "NO" is selected (S608: NO) or the request has not been made within a predetermined time period, the process proceeds to an arrangement selection process (S609), and the file selection process ends.

Next, the arrangement selection process according to the first embodiment will be described. FIG. 7 shows a flowchart illustrating the arrangement selection process according to the first embodiment. The arrangement selection process is performed to select an arrangement pattern of the common pages extracted from each of the selected files when the common pages are printed on the same page of a recording sheet K.

In S701, the process acquires the number N of selected files which have been selected in S602 of the file selection process (FIG. 6A). In S702, the process acquires the number M of selected pages which have been selected in S607 of the file selection process (FIG. 6A). In S703, the process judges whether there is an arrangement pattern in the arrangement table T for printing the total number of pages of data, which is obtained by multiplying the number N of selected files by the number M of selected pages, on a single page of the recording sheet K.

If there is no applicable arrangement pattern (S703: NO), the process judges whether the number M of selected pages is one (S704). If the number M is not equal to one (S704: NO), the process divides the number M of selected pages by two (S705). Then, the process resets the integer part of M/2 to the new number M of pages obtained in S705 and executes S703 again. If the number M of selected pages is one (S704: YES), the process divides the number N of selected files by two (S706). Then, the process resets the integer part of the N/2 to the new number N of selected files obtained in S706 and executes S703 again.

As described above, unless the number M of selected pages is not one, the priority is given to the number M of selected pages to the number N of selected files in dividing the number. Therefore, although the number of common pages which can be compared on the same page of the recording sheet K is reduced, the comparison can be made among a plurality of different files on the same page of the recording sheet K.

If there are one or more applicable arrangement patterns for printing the N×M pages of data on the same page of the recording sheet K in the arrangement table T (S703: YES), the process selects an arrangement pattern having the least number of pages among the applicable arrangement patterns (S707). Then, in S708, the process executes a rasterization process to generate print data for printing the common pages on the same page of the recording sheet K in accordance with the selected arrangement pattern (S708), and the arrangement selection process ends. In S405 of the print process (FIG. 4A), the images are printed on the recording sheet K in accordance with the print data generated in S708.

According to the file selection process described above, the common pages are extracted from the plurality of files with the simple operation of designating the common pages among the plurality of files. Because the common pages extracted from the plurality of files are printed on the same page of the recording sheet K, difference among the plurality of files can be checked on the same page of the recording sheet K.

Hereinafter, a file selection process according to a second embodiment will be described. FIG. 8 schematically shows the file selection process according to the second embodiment. The file selection process according to the second embodiment is performed to print a plurality of designated pages of a main file and a plurality of designated pages of a sub file on the same page of a recording sheet K.

FIG. 8 shows an example, in which second and third pages are extracted from a main file consisting of four pages of data, a second page is extracted from a sub file 1 which is different from the main file and consists of four pages of data, and a third page is extracted from a sub file 2 which is different from the main file or the sub file 2 and consists of four pages of data. Further, print data is generated such that the second and third pages of the main file, the second page of the sub file 1, and the third page of the sub file 2 are printed on the same page of the recording sheet K.

FIG. 9A is a flowchart illustrating the file selection process according to the second embodiment, and FIGS. 9B-9F shows message windows to be displayed on the LCD 41 during execution of the file selection process shown in FIG. 9A. The operation by the user to input instructions according to the second embodiment is the same as the user's operation according to the first embodiment, and thus detailed description thereof will be omitted for brevity.

In the file selection process shown in FIG. 9A, first, the process displays the file names included in the file name list generated in S401 of the print process (FIG. 4A) (S901). For example, as shown in FIG. 9B, a message window showing a message such as "Please select a main file." and the file names (e.g., "1. testdata.pdf," "2. sample.pdf," "3. text.pdf," and "4. text2.pdf") included in the file name list are displayed on the LCD 41.

In S902, the process judges whether a file name is selected as the main file from the listed file names within a predetermined time period. If a file name is selected as the main file (S902: YES), the process deletes the selected file name from the file name list (S903). Then, the process analyzes the main file which is identified based on the selected file name, determines the page numbers of printable pages indicating respective pages constituting the main file, and generates a page number list which is a list of printable page numbers (S904).

At this stage, the process changes the message window displayed on the LCD 41 from the window shown in FIG. 9B to a window shown in FIG. 9C. For example, as shown in FIG. 9C, the newly displayed window shows a message such as "Which page do you want to print?" and the page numbers of the printable pages (e.g., 1, 2, 3, 4, 5, and 6) included in the page number list generated in S904 on the LCD 41 (S905).

In S905, the process judges whether one of the page numbers of the printable pages is selected within a predetermined time period. If none of the page numbers is selected within the predetermined time period (S906: NO), the file selection process ends. If one of the page numbers is selected (S906: YES), the process switches the message window displayed on the LCD 41 from the window shown in FIG. 9C to a window shown in FIG. 9D. In the message window shown in FIG. 9D, a message such as "Do you want to select another page?" and selection buttons, "YES" and "NO", are displayed on the LCD 41.

In S907, the process judges whether a request for selecting another page number of the printable pages is made (S907). If "YES" is selected (S907: YES), the process deletes the selected page number of the printable page from the page number list (S908) and generates a new page number list (S904). The process displays the printable page numbers included in the newly generated page number list on the LCD 41 (S905). Thereafter, the process performs S906 and subsequent step(s).

If "NO" is selected (S907: NO or the request has not been made within the predetermined time period, the process displays the file names included in the file name list generated in S904 on the LCD 41 (S909).

An example of the display is shown in FIG. 9E. As shown in FIG. 9E, the message window displayed on the LCD 41 includes a message such as "Please select a sub file." and the file names (e.g., "1. testdata.pdf," "2. sample.pdf," and "3. text2.pdf") included in the file name list. That is, the file name, "text.pdf", is selected as the main file in S912, and thus, in FIG. 9E, the file name, "text.pdf", is deleted from the displayed file names.

In S910, the process judges whether a file name is selected as a sub file from the listed file names. If a file name is selected as the sub file (S910: YES), the process analyzes the sub file identified by the file name selected in S910, determines the page numbers indicating respective pages constituting the sub file as page numbers of printable pages, and generates a page number list which is a list of the page numbers of the printable pages (S911). It should be noted that the page number list generated in S911 is different from the page number list generated in S904.

At this stage, as shown in FIG. 9F, a message window showing a message "Which page do you want to print?" and the printable page numbers (e.g., 1, 2, 3, 4, 5, and 6) included in the page number list generated in S911 are displayed on the LCD 41 (S921). Then, the process judges whether a page number is selected within a predetermined time period (S913). If none of the page numbers is selected within the predetermined time period (S913: NO), the file selection process ends.

If a page number is selected (S913: YES), the process judges whether the number of pages selected as the sub file is equal to or less than the number of pages selected as the main file (S914). If the number of pages selected as the sub file is equal to or less than the number of pages selected as the main file (S914: YES), the process performs S909 and subsequent steps. If the number of pages selected as the sub file is greater than the number of pages selected as the main file (S914: NO), the process moves to the arrangement selection process (S915) and ends the file selection process.

The arrangement selection process in S915 is similar to the process shown in FIG. 7 except that the number N of selected files is replaced with the number N of selected main files and the number M of selected pages is replaced with the number M of selected sub files. Therefore, the description of the arrangement selection process called in S915 will be omitted for brevity.

As described above, with the file selection process according to the second embodiment, the user can designate a plurality of pages of the main file and a page of each sub file arbitrarily. Therefore, flexibility in selecting the pages which can be printed on the same page of the recording sheet K is improved. Further, by printing the designated pages based on the print data generated according to the above-described second embodiment, a plurality of pages of the main file and a designated page of each sub file can be compared on the same page of the recording sheet K.

Figure 11:
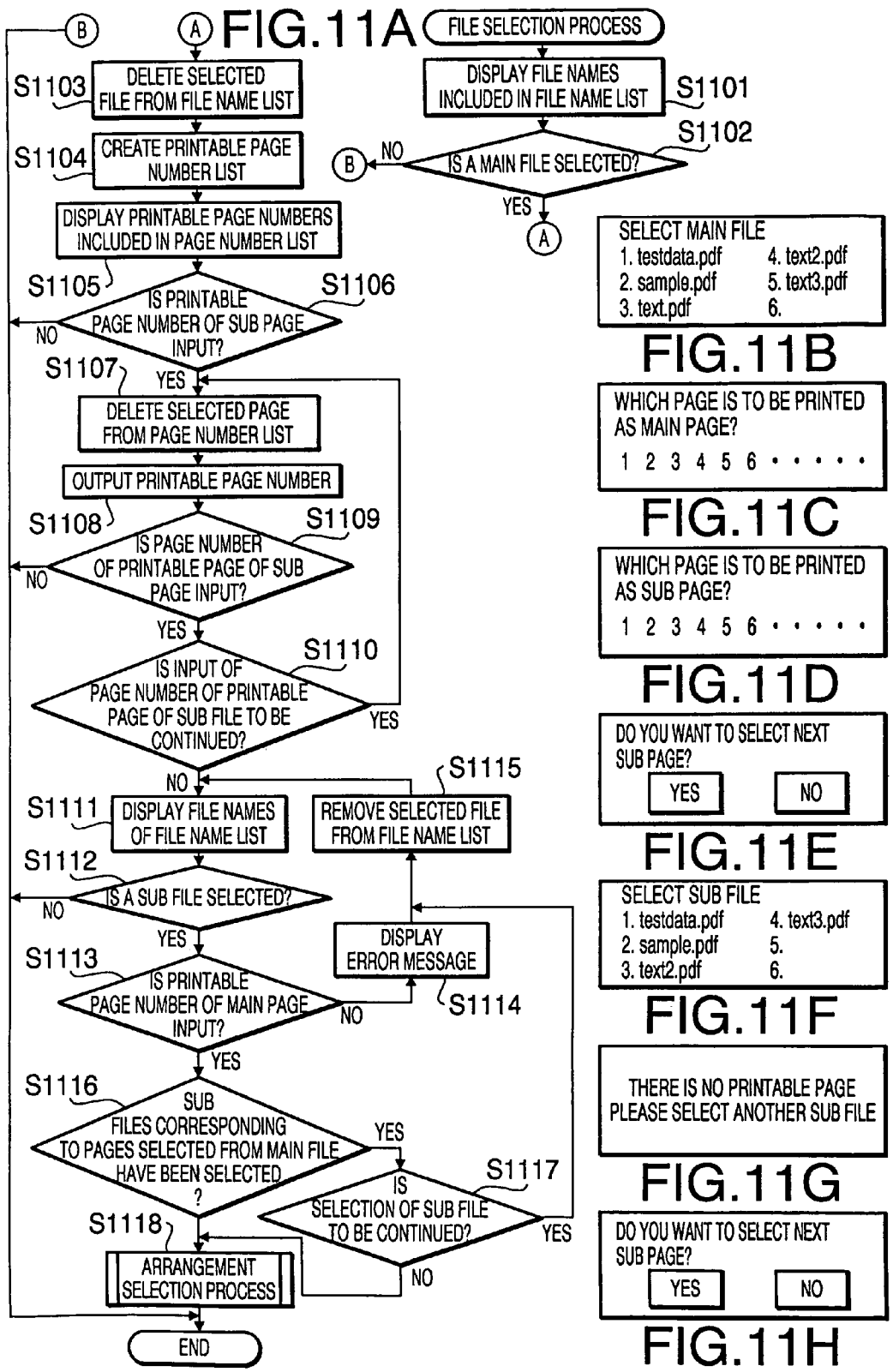

Next, a file selection process according to a third embodiment will be described with reference to FIGS. 10-12. FIG. 10 schematically shows the file selection process according to the third embodiment. According to the third embodiment, the file selection process is performed to extract a plurality of pages (e.g., one main page and one or more sub pages) from a main file and a plurality of pages, which are common to the main page of the main file, from a plurality of sub files and to print the extracted pages on the same page of a recording sheet K.

According to the third embodiment, as shown in FIG. 10, for example, a second page for a main page and a third page for a sub page are extracted from a main file consisting of four pages of data, and a second page is extracted from each of a sub file 1 and a sub file 2, each of which consists of four pages of data. Then, print data is generated such that the second page for the main page and the third page for the sub page of the main file and the second pages of the sub file 1 and the sub file 2 are printed on the same page of the recording sheet K.

Next, the file selection process according to the third embodiment will be described. FIG. 11A is a flowchart illustrating the file selection process according to the third embodiment, and FIGS. 11B-11H show message windows to be displayed on the LCD 41 during execution of the file selection process show in FIG. 11A. The operation by the user to input instructions according to the third embodiment is the same as the user's operation according to the first embodiment, and thus detailed description thereof will be omitted for brevity.

In the file selection process shown in FIG. 11A, the process displays the file names included in the file name list generated in S401 of the print process (FIG. 4A) on the LCD 41 (S1101). Specifically, for example, a massage such as "Please select a main file." and the file names (e.g., "1. textdata.pdf," "2. sample.pdf," "3. text.pdf," "4. text2.pdf," and "5. text3.pdf") included in the file name list are displayed on the LCD 41, as shown in FIG. 11B.

In S1102, the process judges whether a file name is selected as the main file (S1102). If a file name is selected as the main file (S1102: YES), the process deletes the selected file name from the file name list (S1103). Then, the process analyzes the main file which is identified by the selected file name, determines the page numbers of printable pages indicating respective pages constituting the main file, and generates a page number list which is a list of printable page numbers (S1104).

Then, the process switches the message window displayed on the LCD 41 from the message window as shown in FIG. 11B to a message window shown in FIG. 11C. For example, the message window shown in FIG. 11C shows a message such as "Which page do you want to print as a main page?" and the page numbers of the printable pages (e.g., 1, 2, 3, 4, 5, and 6) included in the page number list generated in S1104 on the LCD 41 (S1105).

Then, the process judges whether one of the page numbers of the printable pages is selected as the main page within a predetermined time period (S1106). If none of the page numbers is selected as the main page within the predetermined time period (S1106: NO), the file selection process ends.

If one of the page numbers is selected as the main page (S1106: YES), the process deletes the selected page number from the existing page number list (the list generated in S1104) in S1107, and displays a message window shown in FIG. 11D on the LCD 41 (S1108). Specifically, the message window shown in FIG. 11D shows a message such as "Which page do you want to print as a sub page?" and the page numbers of the printable pages (e.g., 1, 3, 4, 5, and 6) included in the page number list generated in S1107 are displayed on the LCD 41. It is assumed that the second page is selected as the main page in S1106 and thus the page number "2" is deleted from the page numbers of the printable pages in the message window shown in FIG. 11D.

In S1109, the process judges whether one of the page numbers of the printable pages is selected as the sub page within a predetermined time period. If none of the page numbers is selected within the predetermined time period as the sub page (S1109: NO), the file selection process ends.

If one of the page numbers is selected as the sub page (S1109: YES), the message window as shown in FIG. 11D is switched to a message window shown in FIG. 11E. That is, the message window shown in FIG. 11E shows a message such as "Do you want to select another sub page?" and selection buttons, "YES" and "NO", on the LCD 41.

Next, the process judges whether a request for selecting another page number of the printable pages as the sub page is made (S1110). If "YES" is selected (S1110: YES) the process moves to S1107 and performs subsequent steps. If "NO" is selected or the request has not been made within a predetermined time period (S1110: NO), the process displays the file names included in the file name list generated in S1107 on the LCD 41 (S1111).

For example, as shown in FIG. 11F, a message such as "Please select a sub file." and the file names (e.g., "1. testdata.pdf," "2. sample.pdf," "3. text2.pdf," and "4. text3.pdf") are displayed on the LCD 41. According to the third embodiment, it is assumed that, a file name, "2. text.pdf", is selected as the main file in S1102 and thus the file name, "text.pdf", is deleted from the file name list in the message window shown in FIG. 11F.

In S1112, the process judges whether a file name is selected as the sub file. If a file name is selected (S1112: YES), the process analyzes the sub file identified by the selected file name, and judges whether the selected the sub file includes a printable page (i.e., a common page) having a page number that is the same as the page number of the page selected from the main file as the main page in S1106 (S1113).

If the selected sub file does not include the printable page (S1113: NO), the process displays an error message (S1114) as shown in FIG. 11G. For example, the message window showing a message such as "There is no printable page. Please select another sub file." is displayed on the LCD 41.

In S1115, the process deletes the file name selected in S1114 from the file name list. Then, the process moves to S1111 and performs subsequent steps.

If the process judges that the selected sub file includes the printable page (S1113: YES), the process judges whether sub files have been selected as many as the printable pages selected from the main file (i.e., one main page and one or more sub pages) (S1116).

If sub files have not been selected (S1116: NO), the process judges whether the selection of the sub files is to be continued (S1117). Specifically, the process switches the message window displayed on the LCD 41 to a message window shown in FIG. 11H, in which a message such as "Do you want to select another sub file?" and selection buttons, "YES" and "NO", are indicated. Then, the process judges which of "YES" and "NO" is selected. If "YES" is selected (S1117: YES), the process moves to S1115 and performs subsequent steps.

If "NO" is selected or no input has been made within a predetermined time period (S1117: NO), the process performs an arrangement selection process described later (S1118) and ends the file selection process. If the sub files have been selected (S1116: YES), the process performs the arrangement selection process (S1118) and ends the file selection process.

FIG. 12 is a flowchart illustrating the arrangement selection process according to the third embodiment. The arrangement selection process is performed to select an arrangement pattern for a plurality of pages that are selected from a plurality of files to be printed on the same page of a recording sheet K.

In S1201, the process acquires the number N of selected pages which is the sum of the number of printable pages selected from the main file as the main page in S1106 and the number of printable pages selected from the main file as the sub pages in S1109 (S1201). Then, the process judges whether there is an arrangement pattern in an arrangement table for printing the number N of selected pages on the same page of a recording sheet K (S1202).

If there is no applicable arrangement pattern (S1202: NO), the process divides the number N of selected pages by two (S1203). Then, the process resets the number N to the integer part of N/2 and performs S1202 again.

If there are one or more applicable arrangement patterns (S1202: YES), the process selects an arrangement pattern having the least number of pages among the applicable arrangement patterns (S1204). Then, the process executes a rasterization process to generate print data for printing the pages extracted from the plurality of files in accordance with the selected arrangement pattern (S1205), and ends the arrangement selection process. It should be noted that, in S405 of FIG. 4A, the images are printed on the same page of the recording sheet K based on the print data generated in S1208.

As described above, according to the third embodiment, a plurality of pages which are common with a main page of a main file can be selected automatically from a plurality of sub files by the user designating the main page of the main file. Further, a sub page of the main file can be designated arbitrarily. By forming images on the same page of a recording sheet K in accordance with the print data generated as described above, a plurality of pages (one main page and one or more sub pages) of the main file and common pages, which are common with the main page of the main file, of a plurality of sub files can be compared on the same page of the recording sheet K.

Next, a file selection process according to a fourth embodiment will be described. FIG. 13 schematically shows the file selection process according to the fourth embodiment. In the fourth embodiment, print data is generated such that a plurality of pages of a main file and a common page of each sub file which corresponds to one of the plurality of pages of the main file are printed on the same page of a recording sheet K.

As shown in FIG. 13, according to the fourth embodiment, for example, print data is generated such that second and third pages of a main file consisting of four pages, a second page of a sub file 1 which is common with the second page of the main file, and a second page of a sub file 2 which is common with the third page of the main file, are printed on the same page of a recording sheet K.

Figure 14B:
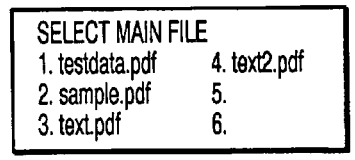
Figure 14C:
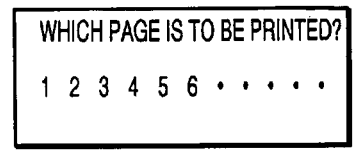
Figure 14D:
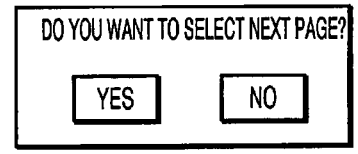

FIG. 14A is a flowchart illustrating the file selection process according to the fourth embodiment, and FIGS. 14B-14D are message windows to be displayed on the LCD 41 during execution of the file selection process shown in FIG. 14A. The operation by the user to input instructions according to the fourth embodiment is the same as the user's operation according to the first embodiment, and thus detailed description thereof will be omitted for brevity.

First, the process displays the file names included in the file name list generated in S401 of the print process (FIG. 4A) on the LCD 41 (S1401). For example, as shown in FIG. 14B, a message such as "Please select a main file." and the file names (e.g., "1. testdata.pdf," "2. sample.pdf," "3. text.pdf," and "4. text2.pdf") included in the file name list are displayed on the LCD 41.

Then, the process judges whether a file name is selected as the main file from the listed file names within a predetermined time period (S1402). If a file name is selected (S1402: YES), the process deletes the selected file name from the file name list (S1403). Then, the process analyzes the main file identified by the selected file name, determines the page numbers of the printable pages indicating respective pages constituting the main file, and generates a page number list which is a list of printable page numbers (S1404).

Then, the process switches the message window displayed on the LCD 41 from the window shown in FIG. 14B to a window shown in FIG. 14C. For example, the message window shown in FIG. 14C shows a message such as "Which page do you want to print?" and the page numbers of the printable pages (e.g., 1, 2, 3, 4, 5, and 6) included in the page number list generated in S1404 on the LCD 41 (S1405).

In S1406, the process judges whether a page number is selected within a predetermined time period. If a page number is not selected within the predetermined time period (S1406: NO), the file selection process ends. If a page number is selected (S1406: YES), the process switches the message window displayed on the LCD 41 from the window shown in FIG. 14C to a window shown in FIG. 14D. For example, the message window shown in FIG. 14D shows a message such as "Do you want to select another page?" and selection buttons, "YES" and "NO" on the LCD 41.

In S1407, the process judges whether a request for selecting another page number of the printable pages is made. If "YES" is selected (S1407: YES), the process deletes the selected page number of the printable page from the page number list (S1408) and generates a new page number list (S1404). Then, the process displays the page numbers of the printable pages included in the newly generated page number list on the LCD 41 (S1405). Then, the process performs S1406 and subsequent step(s).

If "NO" is selected (S1407: NO or the request has not been made within a predetermined time period, the process displays the file names included in the file name list generated in S1404 (S1409).

Figure 14E:
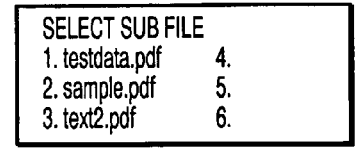

For example, as shown in FIG. 14E, a message such as "Please select a sub file." and the file names (e.g., "1. testdata.pdf," "2. sample.pdf," and "3. text2.pdf,") included in the file name list are displayed on the LCD 41. According to the fourth embodiment, it is assumed that a file name, "text.pdf", is selected as the main file in S1402, and thus, the file name, "text.pdf", is deleted from the file names indicated in the window shown in FIG. 14E.

In S1410, the process judges whether a file name is selected as the sub file. If a file name is not selected (S1410: NO), the file selection process ends. If a file name is selected (S1410: YES), the process judges whether sub files have been selected as many as the printable pages selected from the main file (S1411). If sub files have not been selected (S1411: NO), the process moves to S1409 and performs subsequent steps. If sub files have been selected (S1411: YES), the process performs the arrangement selection process (S1412) and then ends the file selection process. The arrangement selection process according to the fourth embodiment is the same as that according to the third embodiment (FIG. 12), and therefore description thereof will be omitted for brevity.

As described above, according to the fourth embodiment, a page which is common with a page of a main file can be selected automatically from a sub file by the user designating the page of the main file. Further, a page which is common with another page of the main file can also be selected automatically from another sub file by the user designating the another page of the main file. By forming images on the same page of a recording sheet K based on the print data generated as described above, a plurality of pages of the main file and common pages of the sub files which correspond to the plurality of pages of the main file can be compared on the same page of the recording sheet K.

Next, a file selection process according to a fifth embodiment will be described. FIG. 15 schematically shows the file selection process according to the fifth embodiment. According to the fifth embodiment, print data is generated such that a plurality of pages, which are extracted from pages constituting each chapter in different files and are common with each other, i.e., have the same page number, among the different files, are printed on the same page of a recording sheet K.

In an example shown in FIG. 15, a main file contains NA chapters and a sub file contains NB chapters. Specifically, the main file includes a first chapter consisting of first and second pages, a second chapter consisting of third and fourth pages, and an NA-th chapter consisting of (2NA-1)-th and 2NA-th pages. The sub file includes a first chapter consisting of a first page, a second chapter consisting of a second page, and an NB-th chapter consisting of an NB-th page.

In this example, print data is generated such that the first and second pages constituting the first chapter of the main file and the first page constituting the first chapter of the sub file are printed on the same page of a recording sheet K, the third and fourth pages constituting the second chapter of the main file and the second page constituting the second chapter of the sub file are printed on the same page of another recording sheet K, and the (2NA-1)-th and 2NA pages constituting the NA-th chapter of the main file and the NB-th page constituting the NB-th chapter of the sub file are printed on the same page of other recording sheet K.

FIG. 16 is a flowchart illustrating the file selection process according to the fifth embodiment. The operation by the user to input instructions according to the fifth embodiment is the same as the first embodiment, and thus detailed description thereof will be omitted for brevity.

In S1601, the process displays the file names included in the file name list generated in S401 of the print process (FIG. 4A) on the LCD 41. Then, the process judges whether one of the file names is selected as the main file (S1602). If none of the file names is selected as the main file within a predetermined time period (S1602: NO), the file selection process ends.

If one of the file names is selected as the main file (S1602: YES), the process deletes the selected file name from the file name list (S1603). Then, the process judges whether one of the file names is selected as the sub file (S1604). If none of the file names is selected as the sub file within a predetermined time period (S1604: NO), the file selection process ends.

If one of the file names is selected as the sub file (S1604: YES), a counter X representing the chapter number of each file is set to one (1) (S1605). Then, the process analyzes the main file identified by the file name selected in S1602 and acquires the number M of pages constituting the first chapter (S1606). When the process executes S1606, the process also analyzes the tonal number of chapters of the main file (i.e., NA) and stores the total number of chapters (i.e., NA) in the RAM 24.

Next, the process analyzes the sub file identified by the file name selected in S1604, and acquires the number N of pages constituting the first chapter (S1607). When the process executes S1607, the process also analyzes the total number of the chapters of the sub file (i.e., NB) and stores the total number of the sub file (i.e., NB) in the RAM 24.

In S1608, the process compares the number M of pages constituting the first chapter of the main file and the number N of pages constituting the first chapter of the sub file. In this step, the process also determines which number is larger the other between the number M and the number N and sets the larger number to a variable P (S1608).

According to the fifth embodiment, instead of the arrangement table including the arrangement patterns as shown in FIG. 3A, an arrangement table including arrangement patterns of, for example, two rows by one column, two rows by two columns, two rows by three columns, two rows by four columns, two rows by five columns, two rows by six columns, is prepared. The pages of the main file are arranged in one of the two rows, and the pages of the sub file are arranged in the other of the two rows.

In S1609, the process judges whether there is an applicable arrangement pattern for printing (P×2) pages on the same page of a recording sheet K. If there is no applicable arrangement pattern (S1609: NO), the process divides the variable P by two and resets the integer part of P/2 to the variable P (S1610). Thereafter, the process moves to S1609.

If there are one or more applicable arrangement patterns (S1609: YES), the process selects an arrangement pattern having the least number of pages among the applicable arrangement patterns (S1611). Then, the process executes a rasterization process to generate print data for printing the pages constituting an X-th chapter of the main file and the pages constituting the X-th chapter of the sub file on the same page of the recording sheet K, based on the selected arrangement pattern (S1612).

Next, the process judges whether the counter X coincides with the chapter number 2NA of the main file and the chapter number NB of the sub file (S1613). If the counter X does not coincide with the chapter number 2NA or NB (S1613: NO), the counter X is incremented by one (S1614), and the process performs the steps starting from S1605. If the counter X coincides with the chapter numbers 2NA and NB (S1614: YES), the file selection process ends.

As described above, according to the fifth embodiment, print data for printing a plurality of pages, which are extracted from each chapter having the same chapter number in different files on the same page of a recording sheet K, can be generated easily.

It should be noted that the present invention need not be limited to the configurations described above, and can be modified in various ways without departing from the scope of the invention.

In the above-described embodiments, the pages of the main file and the pages of the sub file(s) are printed on the same page of the recoding sheet K in a similar manner. However, they may be printed differently. That is, for example, the pages of the main file may be printed larger in size than the pages of the sub file. Alternatively or optionally, the contents of the pages of the main file may be printed in boldface type. Further, different fonts and/or colors may be used for printing the pages of the main file and the pages of the sub file.

What is claimed is:

1. An image forming device, comprising:
a printing unit configured to print a plurality of images on a recording sheet;
a page number acquiring unit configured to analyze a plurality of files subject to be printed and acquire page numbers of page data included in the respective files;
a common page number identifying unit configured to identify common page numbers which are page numbers included in the page numbers acquired by the page number acquiring unit and commonly existing among the plurality of files subject to be printed; and
a print control unit configured to control the printing unit to print images based on the page data corresponding to the common page numbers identified by the common page number identifying unit such that images corresponding to one of the common page numbers and respectively included in the plurality of files are printed on a single recording sheet, and that images based on the page data not corresponding to the common page numbers are not printed on a single recording sheet on which images based on the page data corresponding to the common page numbers are printed, wherein the common page number identifying unit is configured such that:
when the page number acquiring unit acquires page numbers for one file and if page numbers for the other files are not stored in a storing unit, the common page identifying unit executes a first process to cause the storing unit to store the page numbers acquired by the page number acquiring unit;
when the page number acquiring unit acquires the page numbers for one file, if page numbers for another file are stored in the storing unit, the common page identifying unit executes a second process to compare the page numbers acquired by the page number acquiring unit with the page numbers stored in the storing unit, and store page numbers common between the page numbers acquired by the page number acquiring unit and the page numbers stored in the storing unit, while page numbers uncommon between the page numbers acquired by the page number acquiring unit and the page numbers stored in the storing unit are not stored in the storing unit; and
wherein the print control unit executes a print control process using the page numbers stored in the storing unit as the common page numbers identified by the common page number identifying unit when the common page identifying unit has executed at least one of the first process and the second process for all files.

2. The image forming device, according to claim 1, wherein the page number acquiring unit is configured to acquire a plurality of page numbers as common page numbers, wherein the page extracting unit is configured to extract a plurality of pages of images from the page data contained in each of the plurality of files based on the plurality of common page numbers acquired by the page number acquiring unit, and wherein the print control unit is configured to control the printing unit to print the plurality of pages of images, which are extracted by the page extracting unit, on a page of the recording sheet.

3. The image forming device according to claim 1, further comprising an arrangement unit configured to determine an arrangement pattern for the plurality pages of images such that the arranged pages can be printed on a page of a recording sheet.

4. The image forming device according to claim 1, further comprising:

a judging unit configured to judge whether a sum of the number of pages of images which are extracted from the files subject to be printed based on the common page number is greater than a predetermined value; and a reducing unit configured to reduce the number of pages to be printed on a page of the recording sheet without reducing the number of files of which pages of images are printed on a page of the recording sheet.

5. The image forming device according to claim 1, further comprising a common page number selection information input unit configured to allow a user to input common page identifying information which identifies one of the common page numbers identified by the common page number identifying unit, wherein the print control unit executes the print control process with respect to the common page number identified by the common page identifying information from among the common page numbers.

* * * * *